United States Patent [19]

Nealy

[11] 4,272,016

[45] Jun. 9, 1981

[54] INTEGRATED SEWAGE TREATMENT SYSTEM

[76] Inventor: Robert H. Nealy, 365-C11 Newtown Rd., Warminster, Pa. 18974

[21] Appl. No.: 5,542

[22] Filed: Jan. 22, 1979

Related U.S. Application Data

[63] Continuation-in-part of Ser. No. 775,805, Mar. 9, 1977, Pat. No. 4,135,665, which is a continuation-in-part of Ser. No. 477,539, Jun. 7, 1974, abandoned.

[51] Int. Cl.³ .................. F23G 1/00; C02F 3/00; F24D 3/00
[52] U.S. Cl. .................. 237/56; 110/346; 210/612
[58] Field of Search ............ 237/81, 1, 13, 561; 210/12, 152, 181, 175; 60/648; 126/362; 110/346

[56] References Cited

U.S. PATENT DOCUMENTS

| | | | |
|---|---|---|---|
| 1,090,485 | 3/1914 | Lindmark | 237/12.1 |
| 3,171,387 | 3/1965 | Muller | 122/250 R |
| 3,296,122 | 1/1967 | Karassik et al. | 210/603 |
| 3,623,977 | 6/1971 | Reid | 210/612 |
| 3,892,660 | 7/1975 | Romell | 210/612 X |

*Primary Examiner*—William E. Wayner

[57] ABSTRACT

An on-site system in which means for treating domestic sewage generated within a building located thereon are totally integrated with means for modifying space temperatures and for heating water for sanitary and other purposes therein to form a matrix of interrelated and interdependent functions acting together to deliver only non-polluting products to the environment and to achieve maximal energy conservation.

4 Claims, 1 Drawing Figure

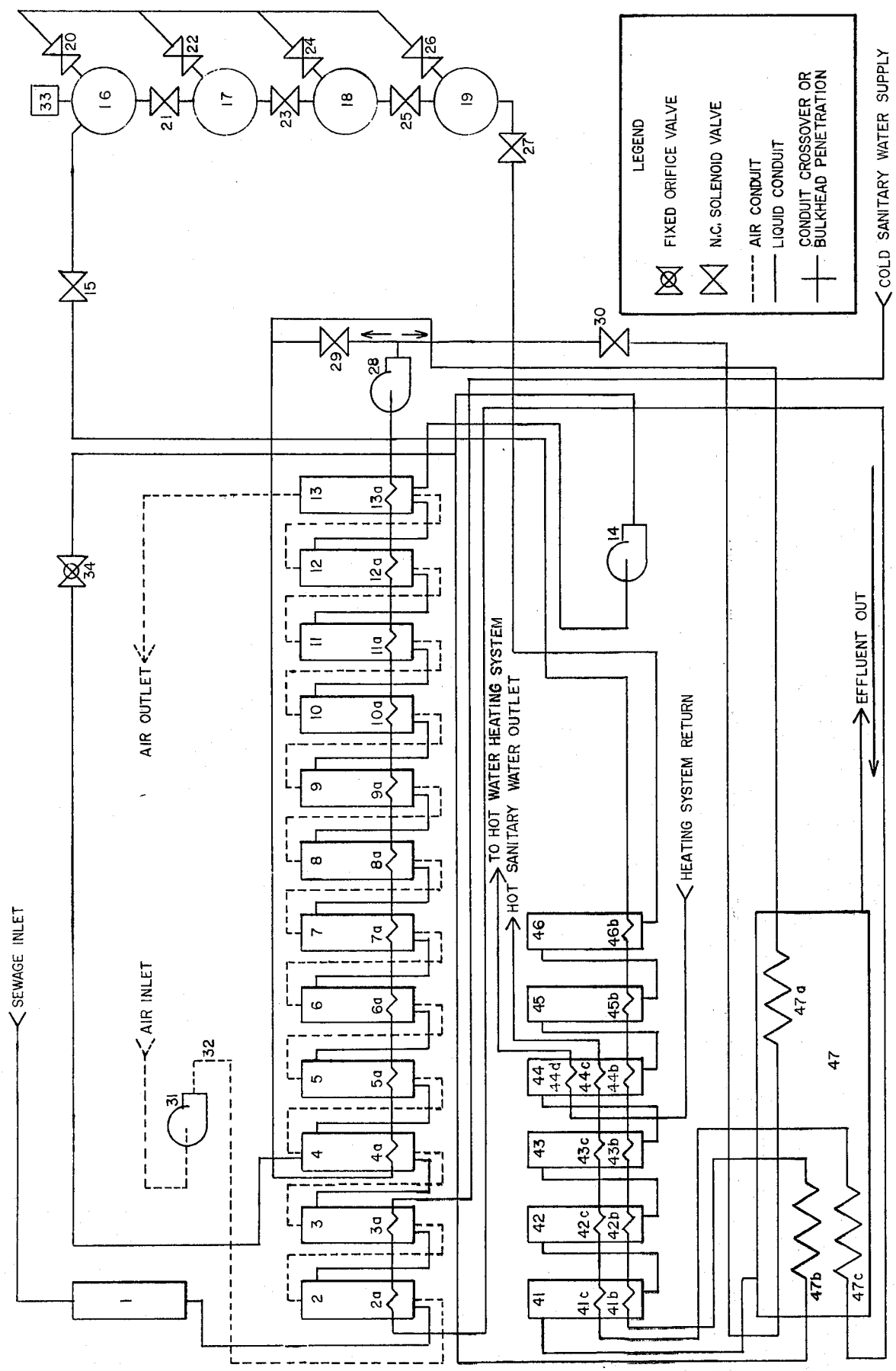

INTEGRATED SEWAGE TREATMENT SYSTEM

CROSS-REFERENCE TO RELATED APPLICATIONS

This application is a continuation-in-part of application Ser. No. 775,805, filed Mar. 9, 1977, and now U.S. Pat. No. 4,135,665. Application Ser. No. 775,805 was in turn a continuation-in-part of application Ser. No. 477,539, filed June 7, 1974, and abandoned subsequent to the filing of application Ser. No. 775,805.

OBJECTIVES OF THE INVENTION

A principal objective of the invention is to provide communal protection against health hazard and aesthetically offensive emanations, independent of soil biology and the soil mechanics pertaining on the site which might originate in a building constructed and occupied thereon.

A further objective of the invention is to enhance the institutional reliability of the communal protection provided by utilizing only means which lend themselves to total automation and avoiding all techniques requiring that chemical reactants be added to the sewage treatment process.

Another important objective of the invention is to intrinsically bias the sewage treatment function in favor of being maintained in good working order by reciprocally integrating it with other functions normally construed as being essential within a building for the physical comfort and convenience of the occupants.

Underlying this objective of "intrinsic bias" is a principle in the public regulation of on-site sewage treatment and disposal that has come to be known in the regulatory community as "institutional reliability." That principle is not to be confused with the usual and ordinary ideas of equipment or process reliability which focus on considerations intrinsic to the equipment or process and do not impel user contributions to their reliability. Certainly the ordinary and usual ideas of reliability are relevant to on-site sewage treatment and disposal, but institutional reliability goes well beyond this to address an unusual situation in which the failures, of any of a multitude of individual users for any of a myriad of reasons, to make the contributions required of them, in the form of unremitting attention to the integrity and continuity of system operations, might bring down penalties, not alone on themselves but on the public-at-large as well, in the form of radiating epidemic disease and ecological damage, the sources of which it could be virtually impossible to pin-point and correct before substantial public injury had been experienced.

It is fundamental to the idea of intrinsic bias, and correspondingly to the principle of institutional reliability that given the economic, social, and career pressures and distructions of daily family life and the variations, and combinations of variations, that exist in society with respect to intelligence, education, and personality, an individual user may more or less frequently and persistently perceive his personal interest as diverging from the public interest with regard to his on-site sewage treatment and disposal system and the undeviating maintenance of the integrity of its processes. In a "stand-alone" system, such a perceived divergence could lead to the failure to provide necessary consumable supplies and to the neglect of maintenance and repairs and, hence, the public penalties cited above. Moreover, with many millions of systems in use, sufficiently close public surveillance to prevent their occurrence could not be accomplished.

It is also fundamental to the concept of intrinsic bias that virtually everyone, even the most eccentric or recalcitrant, wants a warm home in cold weather, a cool one in hot weather, and/or hot water for his personal sanitary needs and that he is unlikely to forego any of them willingly, if he can possibly help it. Whether or not it would be possible by the force of public power or persuasion to prevent or eliminate a sense of divergence between the individual user's interest and the public's interest in this matter of on-site sewage treatment, the inextricable integration of all these household functions will accomplish the same purpose by bringing about a convergence between the public interest about which the user may continue to care very little and his own interest about which he cares a great deal, because the former will be served as a by-product of the latter.

Another objective of the invention is to provide for on-site treatment of human excrement wherein the energy demand for physical treatment of the liquid component thereof is reciprocally integrated with the energy demands of other functions normally existing and consistently used in the structure located on the site to the end that the aggregate system energy demand is reduced by multi-purpose employment.

Another objective of this invention is to provide a waste disposal system which can be used at sites not served by sewer and which converts building wastes into non-polluting gases and vapors for delivery to the atmosphere and relatively harmless water for delivery to the ground.

A still further objective of this invention is to provide a waste disposal system in which liquid-phase thermal sterilization of the waste takes place, resulting in a net decrease of the energy required to operate the system compared with a distillation process.

BACKGROUND OF THE INVENTION

As population throughout the world increases, the disposition of human waste materials becomes an increasingly vexing problem. In many instances, federal, local and state agencies have resorted to stringent restrictions on the methods employed to dispose of such waste.

In less densely populated areas, where the per capita costs of sewage collection and treatment systems are prohibitive, on-site septic tank systems have represented the preferred method of human waste disposal for many years. Unfortunately, septic systems require precise soil characteristics for satisfactory performance. If soil percolation rates are too high, pathogenic and other contaminants can be carried into the water table and thereby present a public health hazard. If percolation rates are too low, septic tank effluents can bubble to the surface and present many undesirable consequences.

For the foregoing and other reasons, public agencies in growing numbers are prohibiting the use of septic tank systes unless rigid sub-surface conditions can be demonstrated to exist at the proposed building site. Because of these standards, there are many otherwise desirable building sites which cannot be utilized for construction unless public sewage systems are installed. This is an eventuality which may not occur. This results in otherwise desirable property lying idle in the face of tremendous needs for more housing and other building construction. These needs are oftentimes relieved by the selection of less desirable properties having better soil conditions.

ADVANTAGES OF THE INVENTION

The system of this invention represents the concept of combing into a single automated sytem a sewerage treatment function and many building service functions normally accomplished by separate systems. The system also extracts energy from sewage solids and organic wastes by incineration and thereby produces a net reduction in the aggregate fuel demand for these functions. Preferably, the system employs liquid-phase thermal sterilization to treat the liquid sewage.

While accomplishing the above benefits, the system of this invention presents only non-polluting and non-noxious gases to the atmosphere. The water presented to the soil is sterile and, thus, free of public health hazards.

Moreover, as previously noted, the system incorporates an intrinsic bias which virtually guarantees maintenance of the system in a manner calculated to serve the public's good as well as the owner's private good.

These and other advantages of the invention will become more apparent to those skilled in the art by reference to the following detailed description when viewed in light of the single accompanying drawing disclosing a schematic of the system.

RELATION TO RELATED PATENT

Ultimately, all sewage treatment has as its objectives the conversion of human digestive and metabolic wastes, and any other organic wastes which may be entrained therewith, into inorganic compounds innocuous to the environment and the destruction of presumptively present pathogenic organisms to prevent the transmission of water-borne epidemic disease.

In the embodiment disclosed in U.S. Pat. No. 4,135,665, pathogenicide was accomplished by thermal sterilization and the mineralization of organics into innocuous inorganics by incineration. In the alternative embodiment disclosed herein, pathogenicide is, likewise, accomplished by thermal sterilization, but the incineration processes have been supplanted by the process of aerobic bacterial digestion.

DETAILED DESCRIPTION OF THE DISCLOSED EMBODIMENT

Illustrated in the drawing is a system of vessels, pumps, valves and conduits combined to accept raw sewage and other organic wastes from a residence or other source and to process them in an improved manner characterized, especially, by a virtually unsurpassable level of institutional reliability in the public interest.

The sewage is exposed to thermally accelerated aerobic bacterial digestion (variously known in the art, also, as aerobic stabilization or mineralization) in the course of which the sewage organics are utilized for bacterial respiration and reproduction and predominantly the former. The resultant bacterial cell mass, including presumptively present pathogenic organisms, is then exposed to thermal sterilization under conditions that assure total kill thereof. Subsequent to sterilization the energy employed therefor is recovered from the sterile effluent and made available for the heating of sanitary water as required in the residence and/or the modification of space-temperature therein. Provision is made for the introduction of supplementary thermal energy to the system to the extent that energy demands for water heating and space-temperature modification may from time to time and season to season exceed that available as a by-product of sterilization.

It is this inextricable integration of sewage treatment and other household services normal and necessary to domestic life that creates a convergence between the individual user's and the public's interests that serves to accomplish a previously unavailable level of institutional reliability without which the public interest is inadequately protected in on-site sewage treatment and disposal applications.

The concept of this alternative embodiment is indifferent to the source of thermal energy which may be derived from solid, liquid or gaseous fossil fuels or, as described herein for convenience, from the conversion of electrical energy through the medium of resistance heaters. Further, it is indifferent to the techniques of heat transfer and recovery employed and these may be varied as judicious compromise of design options in the interest of specific engineering objectives may indicate. Finally, it is also relatively indifferent to the mode of household space-temperature modification used, accommodating equally well to circulating warm-air systems or, as described herein, to circulating hot-water systems both of which are well accepted in modern usage.

Referring now to the schematic, household sewage is, first, introduced into a comminutor 1 wherein suspended solids are reduced to a finely divided condition. Therefrom it flows to a cascade-flow, multi-compartmented, bacterial digester with compartments numbered from 2 to 13, inclusive. The compartmented arrangement as shown serves to prevent short-circuiting of sewage organics through the digester while allowing the advantages of continual flow as sewage is generated in the residence.

Short-circuiting is an exponential function in multi-compartmented digesters, and, if an unlikely 25% were assumed per compartment, the net effect through twelve compartments would be predicted at a negligible $6 \times 10^{-6}\%$. Accordingly, each differential-volume of sewage flow will be exposed to bacterial action for the prescribed period, which in the present case, has been fixed at twenty-four hours but may be shorter or longer.

It is well documented that the rates of aerobic bacterial metabolism and, hence, energy utilization, are temperature dependent, rising to a maximum at 86° F. (sometimes referred to as "the normalization temperature") and falling off as temperature changes in either direction. In the interest of achieving and maintaining this maximum rate during most of the digestion sequence each of the digester compartments 2 through 13 is fitted with a normalization heat transfer coil identified with the common letter "a" on the schematic.

Although the average composited temperature of household sewage entering the system will be approximately 90° F. in most cases it will be impossible, given the variations in water usage, to predict the temperature of any given volume of sewage as it flows from the household. For this reason the scheme employed is to draw temperature down in the first two compartments 2 and 3 and, then, to reheat and normalize in the remaining ten, 4 to 13.

Accordingly, when a demand for hot sanitary water is registered in the household, the cold incoming water is, first, routed through series-connected coils 3a and 2a. The temperature of this cold sanitary water supply will average in the range of 60° F. and the coils are sized to achieve a composited temperature at or below 86° F. in compartment 3. Coils 4a through 13a, as shown, are connected in a closed loop with pump 28 and valve 29, when it is open and valve 30 is closed, by which heat is exchanged between the warmer and cooler of compartments 4 through 13 until a common temperature is achieved.

Compartments 4 through 13 are fitted with resistance temperature sensors, connected in series (not shown). The total resistance through the series will have a characteristic value at the desired, normalization temperature. Should temperature normalize at a level lower than desired, total resistance will be lower. Resistance lends itself to precise measurement and the value exhibited by this series of sensors will be monitored continuously by a microprocessor circuit (not shown).

Upon measurement of total resistance below a prescribed value, the microprocessor will close valve 29 and open valve 30, establishing a new closed loop made up of heat transfer coils 4a through 13a, pump 28, valve 30, heat transfer coil 47a located in the final effluent storage vessel 47, and their interconnecting conduits. The effluent in container 47 will be, at all times, at a temperature level higher than that required in digester compartments 4 through 13 and the operation of this alternative loop will transfer thermal energy from container 47 to compartments 4 through 13 until the desired temperature level is restored therein. At this time the microprocessor will close valve 30 and open valve 29 to restore the original normalization loop to operation. One or the other of these alternative loops will be in operation at all times.

Because the digester is designed for cascade flow in response to the intermittent input of sewage related to varying household activities, the output of effluent will, also, be intermittent, though at a different rate as will be seen, and once it is placed in operation the digester will always contain sewage at differing levels of mineralization. It will be necessary, therefore, to continuously supply air to compartments 2 through 13 to assure the maintenance of aerobic conditions for most efficient bacterial metabolism and freedom from malodorous gas evolution.

An open system-air circuit is provided for this purpose comprising an air blower 31 and conduit 32, shown on the schematic in broken lines connected in series through digester compartments 2 through 13. As shown, air will enter the bottom of each compartment, bubble up through its liquid content to provide agitation and an opportunity for oxygen to enter into solution in the liquid and, in due course, will exit the compartment through its top and pass on to the next compartment in series for a repetition of the same sequence. After exiting compartment 13 the now oxygen-deficient air will be discharged to the atmosphere.

System events and sequences will be slightly atypical during the first few days following initial start-up of the system, but no markedly untoward effects will be realized, and it is convenient, now, to pursue further discussion in terms of a stead-state condition. It should be understood that all control functions with respect to mechanical components discussed will be under the influence of the previously mentioned microprocessor, whose Read-Only-Memory is programmed to control system events and sequences in a prescribed manner, and that all valves in the system are of the normally-closed solenoid-operated variety.

While the digester is, at all times, pursuing its function as described, an effluent thermal-sterilization sequence will be in operation from time to time as the rate of flow of household sewage may require. This involves four horizontally oriented longitudinal tanks 16, 17, 18 and 19, shown in end view in the schematic in their approximate gravitational relationship to digester compartments 2 through 13, each tank having the same capacity as each compartment.

A sterilization preheat-tank 16 is equipped with a high liquid level sensor (not shown). Immediately prior to a given sterilization cycle, the contents of tank 16 will have been delivered during a timed sequence to the sterilizer-tank 17 by way of valve 21. The high liquid level sensor will have been taken and held off line while this sequence is in progress.

When valve 21 closes, the high liquid level sensor will go back on line and call for a new charge of effluent from the digester by opening valve 15 and starting operation of pump 14. Pump 14 will draw effluent from digester compartment 13 and route it through a series-connected set of heat transfer coils, one each located in compartments 41, 42, 43, 44, 45, 46 and 47, and designated on the schematic by the common letter "b". In the course of transit through coils "b", the digester effluent will be heated by a source of thermal energy to be discussed shortly, from 86° F. to approximately 180° F. at which temperature it will be delivered to tank 16.

During this delivery through the conduit connecting pump 14 and tank 16, a small part of the total flow will leak off through a permanently-open, flow-calibrated, fixed orifice valve 34 and return to compartment 4, as shown, to provide a continual supply of vigorous bacteria to re-seed the digestion process.

Immediately prior to the opening of valve 15, tank 16, as will be understood in due course, contained a cloud of water vapor at a temperature of about 268° F. When valve 15 opens this cloud will come into contact with effluent no hotter than 180° F. and will condense to make room for the new charge of effluent. The operation of pump 14 will be terminated and valve 15 will be closed by action of the high liquid level sensor when a prescribed volume of effluent has been delivered to tank 16.

Meanwhile, with the closing of valve 21, a new sterilization cycle commenced in tank 17, which is fitted with a sterilization thermostat (not shown) and an electrical immersion heater (not shown), both of which had been taken and held off line by an earlier control signal and were placed back on line with the opening of valve 21. Simultaneously, a two-hour sterilizer heat-up and hold sequence was initiated. While this sequence is running, other events initiated by actuation of the high liquid level sensor of tank 16 will be in progress.

At the moment these events are initiated, a thermal snubber-tank 18 contains a full charge of sterile effluent at a temperature of approximately 268° F. and a thermal-drop tank 19 contains a full charge of sterile effluent at a temperature of approximately 236° F. Together they represent a mechanism for sterilization thermal energy recovery for regenerative use to reduce the net sterilization thermal energy investment.

This heat recovery mechanism is brought into play by the simultaneous opening of valves 20 and 26. Latent-heat of vaporization extracted from the liquid content of drop-tank 19 will generate vapor which will flow to preheat-tank 16. The original temperature in tank 19 of 236° F. will fall to 212° F. and the original temperature in tank 16 of 180° F. will rise to 204° F. Upon completion of this step in the heat recovery process, valve 26 will close and valve 24 will open. The same process of latent-heat vapor generation will be repeated and the temperature will be normalized in tanks 16 and 18 at approximately 236° F., after which valves 20 and 24 will close.

It is, now, necessary to transfer fluid from tanks 18 and 19 to make room for discharge of tank 17 to tank 18 at the end of the sterilization cycle. The first step in this transfer is accomplished by opening valve 27 to transfer the content of tank 19 to compartment 46. In this process the pressure in tank 19 will fall below atmospheric pressure, but latent-heat will be borrowed from the liquid to generate sufficient vapor to fill the tank, to prevent a vacuum-lock effect. When the transfer of tank 19's content is complete, valve 27 will close and valves 26 and 24 will open, balancing pressure between tanks 18 and 19. Valve 25 will open at this time and the content of tank 18 will flow to tank 19 under the influence of gravity. When this transfer is complete, valves 24, 25 and 26 will close and the system will remain on stand-by alert awaiting completion of the two-hour sterilization cycle.

When the sterilization cycle is complete, the cycle timer will initiate the transfer of energy from tank 17 to tank 16 and the transfer of liquid from tank 17 to tank 18 in the following manner as before.

At the end of the sterilization cycle, liquid in tank 17 will be at a temperature of approximately 300° F. Valves 20 and 22 will now open and latent-heat vapor generation will drop the temperature in tank 17 to about 268° F. and raise the temperature in tank 16 from 236° F. to 268° F. in preparation for the next sterilization cycle. Tank 16 is equipped with an automatic device 33 to vent gases originally dissolved in the effluent and driven out of solution during this preheat sequence.

When temperature normalization between tanks 16 and 17 is complete, valve 20 will close. Valve 22 will remain open, valve 24 will open to balance pressure between tanks 17 and 18 and valve 23 will open to transfer the contents of tank 17 to tank 18. When this transfer is complete valves 23 and 24 will close. Valve 22 will remain open and valve 20 will reopen to balance pressure between tanks 16 and 17. Valve 21 will now open and the contents of tank 16 will flow to tank 17 under the influence of gravity. When this transfer is complete, valve 21 will close and the sterilization sequence is ready to repeat itself from the point where our discussion first started as household requirements may indicate.

It was mentioned earlier that tank 19 discharges to compartment 46. Compartment 46 is one of the compartments making up a multi-compartmented preliminary effluent storage container made up of compartments 41, 42, 43, 44, 45 and 46. As shown on the schematic, cascade-flow occurs between compartments, starting with 46 and ending, ultimately, by way of 45, 44, 43, 42, 41, in that order, in a final effluent storage container 47. Within this storage complex, temperature decay will occur as heat transfer occurs to heat transfer coils "b" as previously discussed with respect to initial preheat of digester effluent as it flows from compartment 13 to tank 16.

Also located in this storage complex is another set of series-connected heat transfer coils, shown on the schematic identified commonly with the letter "c". These cells are committed to the task of regenerative heating of sanitary hot water, as a consequence of which a further contribution to temperature decay will be effected.

After a brief detour through coils 3a and 2a, as previously discussed, partially heated cold sanitary supply water transits successively through coils 47c, 41c, 42c, 43c and 44c to emerge therefrom as household sanitary water at a temperature of approximately 140° F. Because the rate and frequency of sanitary water usage is unpredictable, an electrical immersion heater (not shown) and a resistance thermostat (not shown) are located in compartment 44 to assure a minimum temperature of its effluent content of approximately 160° F. and, thus, avoid upset of the prescribed temperature decay equillibrium from compartment 46 to container 47. This arrangement of immersion heater and thermostat also provides a convenient means for injecting supplementary thermal energy into the system to meet space-temperature modification needs as required, with satisfaction of these needs being accomplished through heat transfer coil 44d as shown.

The final effluent storage container 47 is of a capacity consistent with the daily rated throughput capacity of the system and the composited temperature of its effluent content will oscillate around approximately 90° F. as an end point.

Once a day, for those users who plan no other employment of this effluent, the content of container 47 will be dispersed uniformly on the surface of the homesite to exploit the aerobic mineralization capabilities of the universe of micro-organisms resident in the upper six to twelve inches of all topsoils for final mineralization of the, now, dead bacteria cultivated in the digester, an option available without hazard to public-health because of the total sterility of the effluent.

In many circumstances, however, such a discharge of effluent would be wasteful of both water, which is in short supply in many areas, and thermal energy for which conservation has, recently, become imperative.

Assuming persistently toxic, non-biodegradable, chemicals are kept out of the system its STERILE effluent would be innocuous for all household purposes including human ingestion and, at least, for those too temperamentally skittish to go this far, for all usual and customary sanitary water employment. Should these options be exploited something in the range of 90% to 100% of water recycle could be accomplished with additional benefit to water and energy conservation.

All events occurring within the various system-sequences will be recorded continuously in a Random-Access-Memory register in the previously mentioned microprocessor. When appropriate the content of this register will be compared with the system program stored in the Read-Only-Memory mentioned earlier and any divergence between the two that might represent a hazard to public-health or other public interest will prompt the microprocessor to shut system operations down until the anomaly responsible for the divergence has been corrected. This will assure that no non-sterile effluent can be discharged from the system at any time.

In a general manner, while there has been disclosed an effective and efficient embodiment of the invention, it should be well understood that the invention is not limited to such an embodiment as there might be changes made in the arrangement, disposition and form of the parts without departing from the principle of the present invention as comprehended within the scope of the accompanying claims.

What is claimed:

1. An integrated sewage treatment system comprising:
   (a) first means for collecting domestic sewage composed of raw human excrement and other organic and inorganic wastes entrained in transport water;
   (b) second means for mineralizing the organic component of said sewage;
   (c) third means for liquid-phase sterilization of the effluent remaining after the organic component of said sewage has been mineralized;
   (d) fourth means for regeneratively utilizing the thermal energy contained in said effluent after sterilization to energize at least one other thermally motivated function normally associated with human domestic life; and
   (e) fifth means for disposing of said effluent after its thermal energy has been utilized and depleted.

2. The system of claim 1 and further comprising sixth means for comminuting the insoluble solids entrained in said sewage prior to its thermal sterilization.

3. The system of claim 1 wherein said fourth means energizes space-temperature modification.

4. The system of claim 1 wherein said fourth means energizes water heating functions.